United States Patent
Newman et al.

(10) Patent No.: US 9,214,051 B1
(45) Date of Patent: Dec. 15, 2015

(54) DYNAMIC TOUCH SCREEN FOR AUTOMATED TELLER MACHINES ("ATMS")

(75) Inventors: Kurt D. Newman, Matthews, NC (US); Timothy J. Bendel, Charlotte, NC (US); Rustam N. Wadia, Charlotte, NC (US); Debashis Ghosh, Charlotte, NC (US)

(73) Assignee: Bank of America Coporation, Charlotte, NC (US)

( * ) Notice: Subject to any disclaimer, the term of this patent is extended or adjusted under 35 U.S.C. 154(b) by 889 days.

(21) Appl. No.: 12/983,920

(22) Filed: Jan. 4, 2011

(51) Int. Cl.
| | |
|---|---|
| *G06F 7/04* | (2006.01) |
| *G07F 7/10* | (2006.01) |
| *G07F 19/00* | (2006.01) |
| *G06F 21/31* | (2013.01) |
| *G06F 21/36* | (2013.01) |
| *G06F 3/048* | (2013.01) |
| *G06F 3/0488* | (2013.01) |
| *G06F 3/0481* | (2013.01) |
| *G06Q 20/10* | (2012.01) |

(52) U.S. Cl.
CPC .............. *G07F 7/1016* (2013.01); *G06F 3/048* (2013.01); *G06F 3/0488* (2013.01); *G06F 3/04817* (2013.01); *G06F 21/31* (2013.01); *G06F 21/36* (2013.01); *G06Q 20/1085* (2013.01); *G07F 7/1041* (2013.01); *G07F 19/20* (2013.01)

(58) Field of Classification Search
CPC ..... G07F 7/1041; G07F 7/1016; G07F 19/20; G06F 21/31; G06F 21/36; G06F 3/0488; G06F 3/048; G06F 3/04817; G06Q 20/1085
USPC ............. 715/741, 773, 788; 345/173; 705/43; 713/182
See application file for complete search history.

(56) References Cited

U.S. PATENT DOCUMENTS

| | | | |
|---|---|---|---|
| 5,933,515 A | | 8/1999 | Pu et al. |
| 5,949,348 A | * | 9/1999 | Kapp et al. ............... 340/5.4 |
| 6,145,053 A | * | 11/2000 | Smith ........................ 711/112 |
| 6,229,906 B1 | | 5/2001 | Pu et al. |
| 6,373,967 B2 | | 4/2002 | Pu et al. |
| 6,393,139 B1 | | 5/2002 | Lin et al. |
| 6,651,168 B1 | | 11/2003 | Kao et al. |
| 6,654,484 B2 | | 11/2003 | Topping |
| 6,944,773 B1 | | 9/2005 | Abrahams |

(Continued)

FOREIGN PATENT DOCUMENTS

CN      2694364      4/2005

*Primary Examiner* — Amy Ng
*Assistant Examiner* — Sajeda Muhebbullah
(74) *Attorney, Agent, or Firm* — Weiss & Arons LLP; Michael A. Springs, Esq.

(57) ABSTRACT

Systems and methods according to the present invention provide a more secure Automated Teller Machine (ATM) transaction by preventing observation of banking customers' Personal Identification Number (PIN). Such systems and methods make it difficult to obtain a customer's PIN by tracking the hand movement of a customer using an ATM. Inputs presented for a customer selection are preferably dynamically displayed in different locations preferably each time the customer is asked to enter a PIN. Dynamically changing the sequence of the display and/or location of the presented inputs reduces the possibility of mapping the hand movement of the customer to the positions of the inputs displayed for a customer selection. Inputs may also be presented at a very narrow viewing angle, thereby making observation of a PIN difficult. Hence, banking customers are preferably provided with a more robust and secured ATM transaction system.

24 Claims, 9 Drawing Sheets

(56) References Cited

U.S. PATENT DOCUMENTS

| | | | |
|---|---|---|---|
| 7,270,275 B1 | 9/2007 | Moreland et al. | |
| 7,360,248 B1 | 4/2008 | Kanevsky et al. | |
| 7,362,973 B1 | 4/2008 | Dickson et al. | |
| 7,451,116 B2 | 11/2008 | Parmelee et al. | |
| 7,477,239 B2 | 1/2009 | Ray | |
| 7,486,810 B1 | 2/2009 | Accapadi | |
| 7,992,007 B2 * | 8/2011 | Lazzaro et al. | 713/183 |
| 2001/0043726 A1 | 11/2001 | Ikebata et al. | |
| 2001/0049785 A1 | 12/2001 | Kawan et al. | |
| 2001/0052541 A1 | 12/2001 | Kang et al. | |
| 2002/0188872 A1 * | 12/2002 | Willeby | 713/202 |
| 2003/0135764 A1 | 7/2003 | Lu | |
| 2003/0209599 A1 | 11/2003 | Gatto | |
| 2004/0053692 A1 | 3/2004 | Chatigny et al. | |
| 2004/0151353 A1 | 8/2004 | Topping | |
| 2004/0257238 A1 | 12/2004 | De Jongh | |
| 2005/0010649 A1 * | 1/2005 | Payne et al. | 709/217 |
| 2005/0071637 A1 | 3/2005 | Shirakawa | |
| 2005/0111709 A1 | 5/2005 | Topping | |
| 2006/0104486 A1 | 5/2006 | Le Saint et al. | |
| 2006/0224523 A1 * | 10/2006 | Elvitigala | 705/64 |
| 2006/0224645 A1 | 10/2006 | Kadi | |
| 2007/0140530 A1 | 6/2007 | Coogan et al. | |
| 2008/0016276 A1 | 1/2008 | Hong | |
| 2008/0072331 A1 | 3/2008 | Dickson et al. | |
| 2008/0126260 A1 | 5/2008 | Cox et al. | |
| 2008/0169944 A1 | 7/2008 | Howarth et al. | |
| 2008/0226146 A1 | 9/2008 | Niklan | |
| 2009/0173781 A1 | 7/2009 | Ramachandran | |
| 2009/0326732 A1 | 12/2009 | Dickson et al. | |
| 2010/0027045 A1 | 2/2010 | Moore | |
| 2010/0059587 A1 | 3/2010 | Miller et al. | |
| 2010/0174653 A1 * | 7/2010 | Tian et al. | 705/71 |
| 2010/0293605 A1 * | 11/2010 | Longobardi | 726/5 |
| 2011/0156865 A1 | 6/2011 | Baek et al. | |

* cited by examiner

DYNAMIC TOUCH SCREEN FOR AUTOMATED TELLER MACHINES ("ATMS")

FIELD OF TECHNOLOGY

Aspects of the invention relate to preventing unauthorized capture of a users confidential Automated Teller Machine ("ATM") access sequence.

BACKGROUND

ATMs provide banking customers the ability to access bank account information, deposit funds and withdraw funds. ATMs may often obviate the need for a banking customer to consult a human clerk. Additionally, ATMs may be located in a variety of diverse locations remote from banking centers. For example, ATMs may be placed on street corners, in convenience stores, supermarkets or sports arenas. The wide variety of possible locations for an ATM provides banking customers with access to cash and banking account information at convenient public locations.

To prevent the risk of fraudulent access to a customer's banking account information a typical ATM requires a customer to insert a plastic card containing a magnetic stripe or chip. The card is typically issued by the customer's bank and/or other financial institution (collectively hereinafter, "bank"). The magnetic stripe or chip may store data including a unique card number and security information.

In addition to requiring a customer to insert a card, ATMs provide an additional level of protection. Following the receipt of the bank card information, an ATM will prompt the customer to input a personal identification number (PIN). Only if the PIN entered is properly associated with the card inserted by the banking customer will the ATM allow access to cash and bank account information.

However, the wide variety of locations associated with ATMs and lack of close human supervision at the ATM increases the risk of unauthorized access to a customer's bank account information. For example, a thief may utilize a skimming device placed on or in an ATM that reads data encrypted on a banking card's magnetic stripe. The skimmer may be placed over a card slot reader of an ATM and may read the magnetic stripe as the card is inserted into the slot.

A customer may not notice that a skimmer has been placed on or in an ATM because the skimmer may not impede legitimate access to the customer's bank account information. Thus, the skimmer may obtain information encoded on a bank card's magnetic stripe in a manner transparent to the customer. Additionally, the skimmer may wirelessly transmit obtained customer information thus obviating the need for the thief to physically access the skimmer.

A skimmer may also include a hidden camera that may capture a customer's PIN. A hidden camera may also be placed in a different location than a skimmer. The camera may track the hand movements of a banking customer as the customer inputs a PIN. The sequence of different inputs available for selection and their positions are conventionally fixed and uniform for ATM input devices. For example, numeric inputs are displayed in three rows of three inputs and a fourth row having a single input. In a numeric display the number "1" usually appears in the left top corner, the number "3" usually appears in the top right corner and "0" usually appears in the fourth row.

The fixed sequence and positions of the numeric buttons allows an unscrupulous observer to map the movement of the customer's fingers to the numbers entered by the ATM customer. The mapping therefore exposes the customer's PIN. Together with information obtained by a skimmer, an unscrupulous observer may possess the confidential information needed to access a banking customer's cash and bank account information.

Alternatively, an unscrupulous observer may affix a thin keypad overlay to an ATM's keypad. The keypad overlay may contain circuitry that records the buttons pressed by a banking customer. The recorded information may include a PIN entered by the customer.

Additionally, a recording of buttons pressed, or a recording of a customer's hand movements may contain a date and time stamp. The date and time stamp would allow an observer to correlate information gleaned from a skimmer with inputs selected by a customer at the time a specific bank card was inserted. The correlation associates a customer's confidential bank card information to his or her PIN information.

Skimmer devices, keypad overlays and hidden cameras are becoming increasingly common and increasingly difficult to detect. Only a pinhole sized camera is needed to record PIN information. The miniscule footprint of hidden cameras allows the cameras to be skillfully hidden and hard to identify. A keypad overlay or skimmer may look and feel like a legitimate part of the ATM operating in a manner transparent to a customer.

According to the European ATM Security Team (EAST), a not-for-profit payment security organization, ATM crimes in Europe have increased 149 percent between 2007 and 2008. Most of the increase has been linked to ATM skimming attacks. During 2008, a total of 10,302 skimming incidents were reported in Europe. In the United States, between April and May of 2010 one bank estimated its losses due to compromised PIN numbers to be over 200,000 USD.

Therefore, it would be valuable to provide more secure systems and methods of conducting ATM transactions. More secure systems and methods for conducting ATM transactions would help reduce the losses of a banking center and help reduce customer inconvenience due to compromised bank account information. Furthermore, a more secure ATM transaction would give banking customers additional confidence that they are less likely to be victims of identity and/or monetary theft.

Accordingly, it would be desirable to provide systems and methods which reduce exposure of banking customers' confidential PIN and bank account information.

SUMMARY OF THE INVENTION

It is an object of this invention to provide systems and methods which reduce exposure of banking customers' confidential PIN and bank account information.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Systems and methods for providing a more secure ATM transaction are provided. Systems and methods of practicing the current invention may increase the difficulty of obtaining a user's confidential information while the user is conducting an ATM transaction.

A standard ATM includes a screen and displayed keys that may be selected by a user. The displayed keys provide users with a choice of inputs for conducting an ATM transaction. The displayed keys therefore facilitate transactions including cash withdrawals, checking account balances, and making credit card payments. For example, a display of numeric keys allows a user to enter a withdrawal amount, a transfer amount or enter a numeric PIN.

Some ATMs utilize touch screens to display keys available for user selection. A user taps or touches the screen above the displayed key to input a number, letter, or to make any other selection. Some ATMs utilize mechanical keypads to display keys available for user selection. A user may select a displayed key by applying pressure or achieving contact with the desired key.

In conventional numeric layouts, numbers are placed in fixed positions. For example, numbers are displayed in three rows of three inputs and a fourth row having a single input. The number "1" usually appears in the top left corner, and the number "9" usually appears in the bottom right corner. "0" usually appears in the fourth row.

An ATM may also present a user with an alphabetic layout. The standard alphabetic layout is known as a QWERTY layout. The QWERTY layout is named for the first six letters displayed in the top left corner of the alphabetic layout.

Displaying the keys in consistent, conventional locations allows an unscrupulous observer to map the hand movement of a user to the inputs selected. If the displayed keys represent numbers to be selected by a user while entering a PIN, an unscrupulous observer may easily deduce the user's PIN.

To increase the difficulty of mapping a user's selections to the numbers or letters entered, systems and methods according to the current invention provide, at least in part, a dynamic rendering of the keys displayed for user selection. As opposed to conventional numeric, alphabetic or alphanumeric layouts, in which the location of numeric and letter keys are fixed and standard, certain embodiments of the current invention dynamically alter the layout and presentation of the displayed keys.

Figure 6:
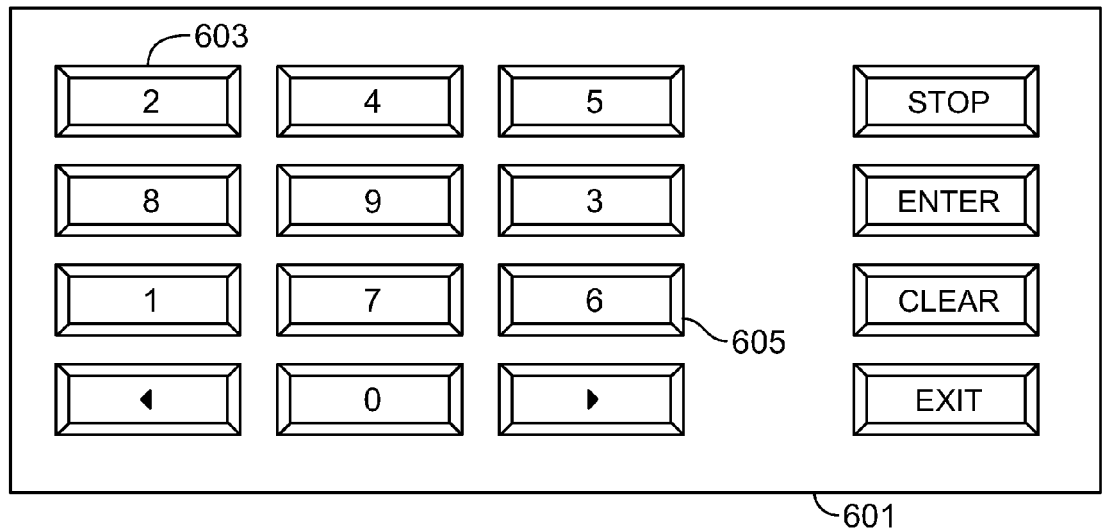
FIG. 6 shows a diagram of a dynamic display of numeric inputs.

The dynamic display may include presenting numeric keys in a different sequence or format each time the system or an ATM asks a user to enter a PIN or confidential access sequence. For example, after a user inserts a bank card, the user may be presented with a randomized sequence of numeric keys. As illustrated in FIG. 6 (described in more detail below) the number "1" is now in the second row from the top, the number "9" is in the fourth row and "0" appears in the third row.

A dynamic display that randomizes the conventional numerical layout increases the difficulty of mapping a user's hand movement to conventional, predefined locations. If a camera had recorded a user's hand movements, an unscrupulous observer would not be certain which numbers were selected. Thus, the likelihood of a user's numeric PIN being compromised would be reduced.

For touch screen ATMs, the position of the displayed keys may be shifted to any position within the display area of the ATM screen. Shifting the position of displayed keys with respect to the overall display may allow a user to enter a PIN outside the view of a human observer or hidden camera.

For example, a hidden camera may have only been positioned to record a user's hand movements at a single location, such as at the center of an ATM screen. Shifting the location of the displayed keys off-center may place a user's hand movements outside the view of the camera. Positioning a camera with a wider angular view may require a larger lens or aperture, causing the camera to be more visible to ordinary observers.

In some embodiments the touch screen of an ATM may offer a narrow viewing angle. A narrow viewing angle reduces the possibility that a camera or observer may view the specific input represented by a particular key. Embodiments of displays with a narrow viewing angle are described more fully in U.S. patent application Ser. No. 12/825,522, filed on Jun. 29, 2010 which is hereby incorporated herein in its entirety.

Some ATMs may use mechanical keypads for presenting inputs available for user selection. For ATMs with mechanical keypads, some embodiments may involve physically modifying the individual buttons or keys of the ATM keypad. In some embodiments the buttons of a conventional keypad would be replaced with transparent buttons. Each transparent button would have its own display visible through the transparent surface of the buttons. Thus, the static display of each conventional key is preferably removed and replaced with new dynamic keys.

A dynamic key may display a number or letter in a different position than a conventional layout. For example, because each dynamic key has its own display visible through a transparent surface, instead of a number "1" being presented in the top left position, the top left position may display the number "5."

Further, a dynamic presentation of a numeric keypad preferably reduces the likelihood of an unscrupulous observer ascertaining a user's numeric PIN. Because of the dynamic presentation of inputs an observer may be unable to map hand movements of a user to an input conventionally associated with a specific location on a keypad.

Moreover, a dynamic presentation of keys may reduce the effectiveness of keypad overlays. A keypad overlay may not be able to ascertain which displayed inputs are associated with a particular key. The dynamic representation of keys preferably undermines a critical assumption of keypad overlays—that the fixed positions of keys on the keypad represent fixed inputs.

In some embodiments, the display of a dynamic key may be offset to a predetermined depth from the transparent key surface. The offset would create a tunnel between the transparent surface of the dynamic key and the display. The side walls between the display and key surface would form the tunnel side walls. The tunnel side walls would prevent viewing of the displayed keys from a side or particular angular views. Only a planar view substantially parallel to the key surface would allow the dynamic key display to be viewed. Restricting the viewing angle of the displayed keys provides an added level of security in preventing unauthorized viewing of the displayed dynamic keys.

In some embodiments, the dynamic keys may include utilizing a display with a narrow viewing angle. Embodiments of displays with narrow viewing angles are described more fully in U.S. patent application Ser. No. 12/825,522, filed on Jun. 29, 2010 which has been incorporated herein in its entirety.

ATMs may also display functional keys. For example, a keypad may contain an "enter" key for finalizing a selection or a touch screen may display a "clear" button to delete the last selected input. In some embodiments, all keys presented for user selection, including functional keys, may be dynamically displayed. Additionally, all keys may be dynamically displayed whether an embodiment utilizes a touch screen or a dynamic keypad for receiving user input.

For example, instead of a number "1" being displayed in the conventional top left corner, the "enter" key may be displayed in the top left position. A number "5" may be displayed in the position previously occupied by the "enter" key.

In some embodiments, not all keys may be dynamically displayed. For example, some embodiments may only dynamically display the top two rows of numbers. The numbers not conventionally included in the top two rows may be displayed in their conventional positions. In some embodiments the lower two rows may be dynamically displayed, with the remaining numbers displayed in the conventional positions.

In some embodiments, a dynamic display may change the position of all numbers in a single row or single column. For example, the numbers "1, 2, 3" which appear in the top row of a conventional numeric layout may be dynamically displayed as "3, 1, 2." The numbers "3, 6, 9" which appear in the last column of a conventional numeric layout may be dynamically displayed as "9, 6, 3." Each row or column may be randomized individually, retaining the digits conventionally part of the row or column. Similarly, keys may be dynamically displayed based on the position of a key on a diagonal line. In some embodiments, individual keys may be selected for dynamic display, with non-selected keys remaining in their conventional positions.

In some embodiments, the shape or pattern formed by a display of the inputs may be dynamically altered. For example, instead of displaying inputs in a conventional rectangular shape, inputs may be dynamically displayed in a diamond or oval shape.

In some embodiments, the inputs that form a particular shape may be presented in sequential order. For example, if numerical inputs are displayed in an oval shape, the number "1" may be displayed on the top of the oval followed by the number "2" and then the numbers "3," "4," "6," "7," "8," "9," and "0". The number "0" would close the oval, and be followed by the number "1." In some embodiments, the order of the inputs and the pattern of the inputs may both be dynamically displayed.

The current system and methods of a more secure ATM transaction contemplate that a dynamic display of keys may be defined by a user or system defined.

In some embodiments, inputs presented for user selection may be dynamically displayed after each input selected by a user. For example, after inserting a bank card a user may be initially presented with a randomized layout. Following the receipt of a first digit of a numeric PIN, the dynamic display may present a re-randomized display or another pattern of presented inputs.

In some embodiments, the number of times inputs presented may be dynamically displayed following a user selection of an input may itself be dynamic. For example, in entering a four digit PIN, a user may experience one to four dynamic displays. In some embodiments, the number of dynamic displays may be randomized. In some embodiments the number of dynamic displays may be user defined or system defined.

In some embodiments, if a user enters an incorrect PIN, inputs presented may be dynamically displayed again. In some embodiments following a defined number of incorrect attempts to enter a PIN, the conventional layout may be presented. The defined number of attempts before a conventional layout is presented may be system defined or user defined.

For example, a user may prefer that after four incorrect attempts to enter a PIN, the display presents a conventional layout. In some embodiments, the user may be presented with an option to display a conventional layout. In some embodiments, the option to display a conventional layout may be executed any time during an ATM transaction. In some embodiments, the user may only be presented with a choice to display a conventional layout after at least one failed attempt to enter a correct PIN.

In some embodiments, the system may randomly choose a predefined number of incorrect attempts to enter a PIN before displaying a conventional layout. For example, the system may randomly choose from between one and three incorrect attempts before presenting a conventional layout. In some embodiments, the system may display a conventional layout following a predefined number of incorrect attempts.

In some embodiments, a user may define the dynamic display that may be presented following insertion of a bank card. For example, some users may prefer a hollow rectangular shape, with the number "1" in the top left corner of the rectangle, the number "3" in the top right corner, the number "6" in the bottom right corner, the number "8" in the bottom left corner, and the number "0" just below the number "1."

As a further example, a user may prefer to only randomize a diagonal row or vertical column of inputs. All other inputs not conventionally part of the designated column or row may still be presented in the conventional locations. Some users may prefer to only dynamically display the inputs that are part of their PIN, and display inputs not part of their PIN in the conventional locations.

For example, if a users PIN is 1234, then the user may choose to randomize the numbers 1234. All other numbers may appear in their conventional locations. Any other combination of keys may be chosen, such as a birthday or anniversary. Keys not selected by the user may be displayed in their conventional positions. Examples of a birthday or anniversary may include randomizing the numbers 0128, representing January 28 or 032914 representing Mar. 29, 2014.

In some embodiments, the identical dynamic display may be presented until a correct PIN is entered. In some embodiments, the user may choose, after a number of incorrect attempts to be presented with a new dynamic display. In some embodiments, the system may define the number of incorrect attempts before presenting a new dynamic display.

In some embodiments, users may be offered the option of opting-out of being presented with a dynamic display. In some embodiments a user may be offered the option of opting-in to be presented with a dynamic display. In some embodiments, a user may be presented with a message reminding the user that the display is dynamically presented.

In some embodiments, after a user has entered a correct PIN, the dynamic display may return to a conventional layout.

Users may be more comfortable entering non-confidential data using a conventional layout. In some embodiments, a conventional layout may not be presented even if a PIN is requested, if the user has not inserted a bank card immediately prior to the PIN request. In some embodiments, each time a user is asked to input a PIN, presented inputs may be dynamically displayed. In some embodiments, the presentation of inputs following an initial input of a PIN may be system or user defined.

The dynamic display may utilize a randomized presentation of inputs available for selection, or other deviations from the conventional presentation of inputs. Some embodiments may allow a user to define a dynamic display, and in some embodiments the dynamic display may be system defined.

As will be appreciated by one skilled in the art, although systems and methods of receiving a user PIN for conducting an ATM transaction have been illustrated, systems and methods according to the invention may be applicable to other areas and other devices. Some embodiments of the invention may also be applied in any area that requires prompting for receipt of a confidential sequence of inputs, such as pre-paid phone booths, and/or confidential sequences entered to gain access to restricted resources. Certain embodiments of the invention may also be implemented on mobile devices such as mobile phone or personal computers.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
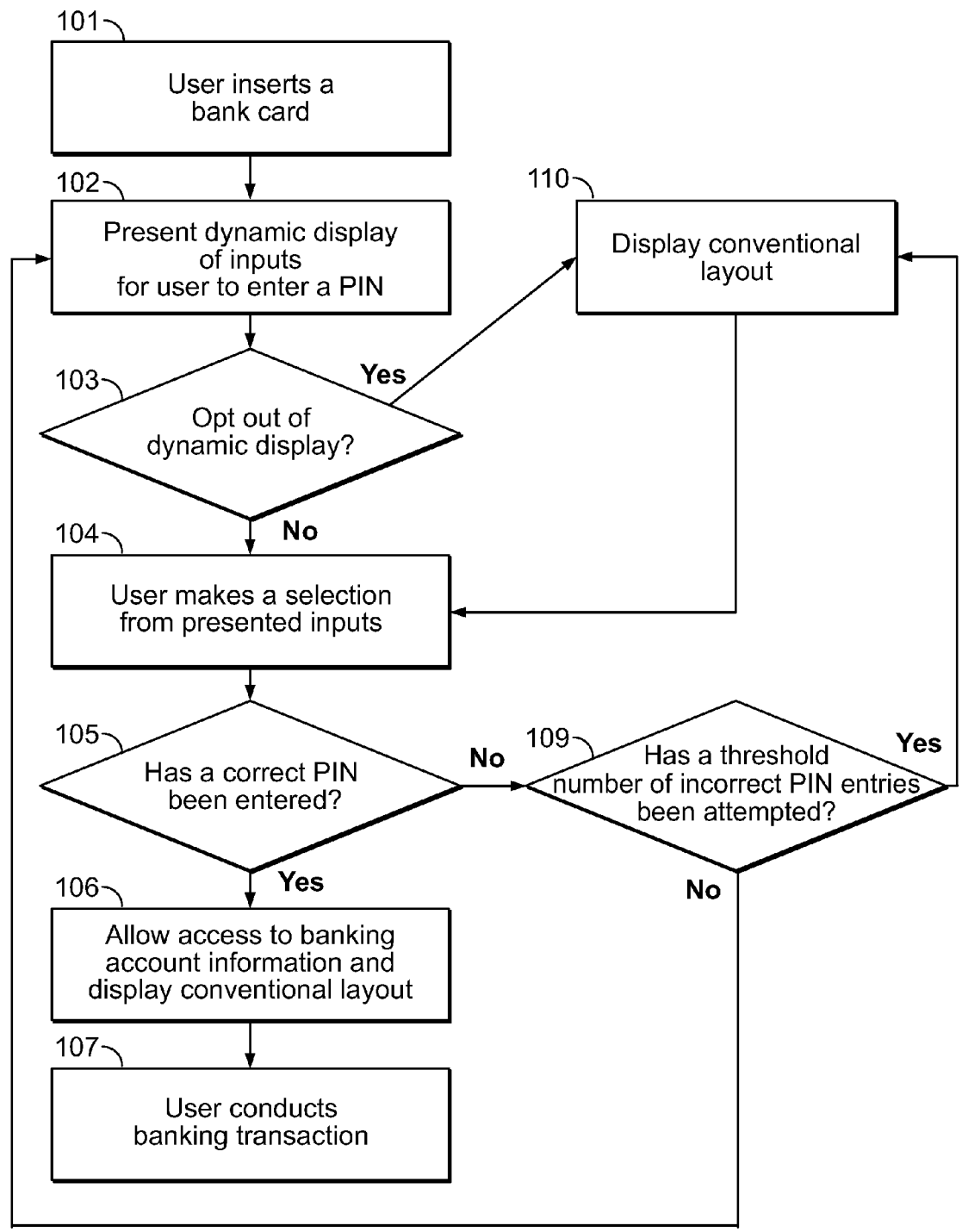
FIG. 1 shows an illustrative flow diagram of steps and options for providing a more secure ATM transaction.

Processes in accordance with the principles of the invention may include one or more features of the process illustrated in FIG. 1. For the sake of illustration, the steps of the process illustrated in FIG. 1 will be described as being performed by a "system". The "system" may include one or more of the features of the apparatus that are shown in FIGS. 2-10 and/or any other suitable device or approach. The "system" may be provided by an entity. The entity may be an individual, an organization or any other suitable entity.

FIG. 1 shows illustrative steps that may be performed by some embodiments of the invention. For the purpose of illustration, the steps will be described as being performed by or on a system in accordance with the principles of the invention.

At step 101, a user or banking customer inserts a bank card into an ATM. Following insertion of the bank card, the user is prompted to enter a confidential access sequence or PIN. At step 102, the inputs presented for user selection are dynamically displayed. The dynamic display may be a randomization of the presented inputs or a non-conventional pattern of presented inputs. At step 103, the user is presented with an option to opt-out of the dynamic display. Some users may be willing to forgo a more secure ATM transaction for the familiarity of a conventional display of inputs available for selection. If a user does opt-out, at step 110, the conventional layout is presented.

At step 104 the user enters a PIN by selecting presented inputs. At step 105, the system verifies that a correct PIN has been received before permitting access to bank account information. If a correct PIN has not been received, at step 109 the system tracks the number of incorrect attempts. If a predefined threshold of incorrect attempts have been made, at step 110 the system presents inputs available for selection in a conventional layout, and at step 104, the user enters a PIN by selecting presented inputs. If the predetermined threshold has not been exceeded, the system presents a dynamic display at step 102.

If a correct PIN has been received by the system, at step 106 the system allows the user to access bank account information and displays inputs available for selection in a conventional layout. At step 107 the user conducts a banking transaction.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 2:
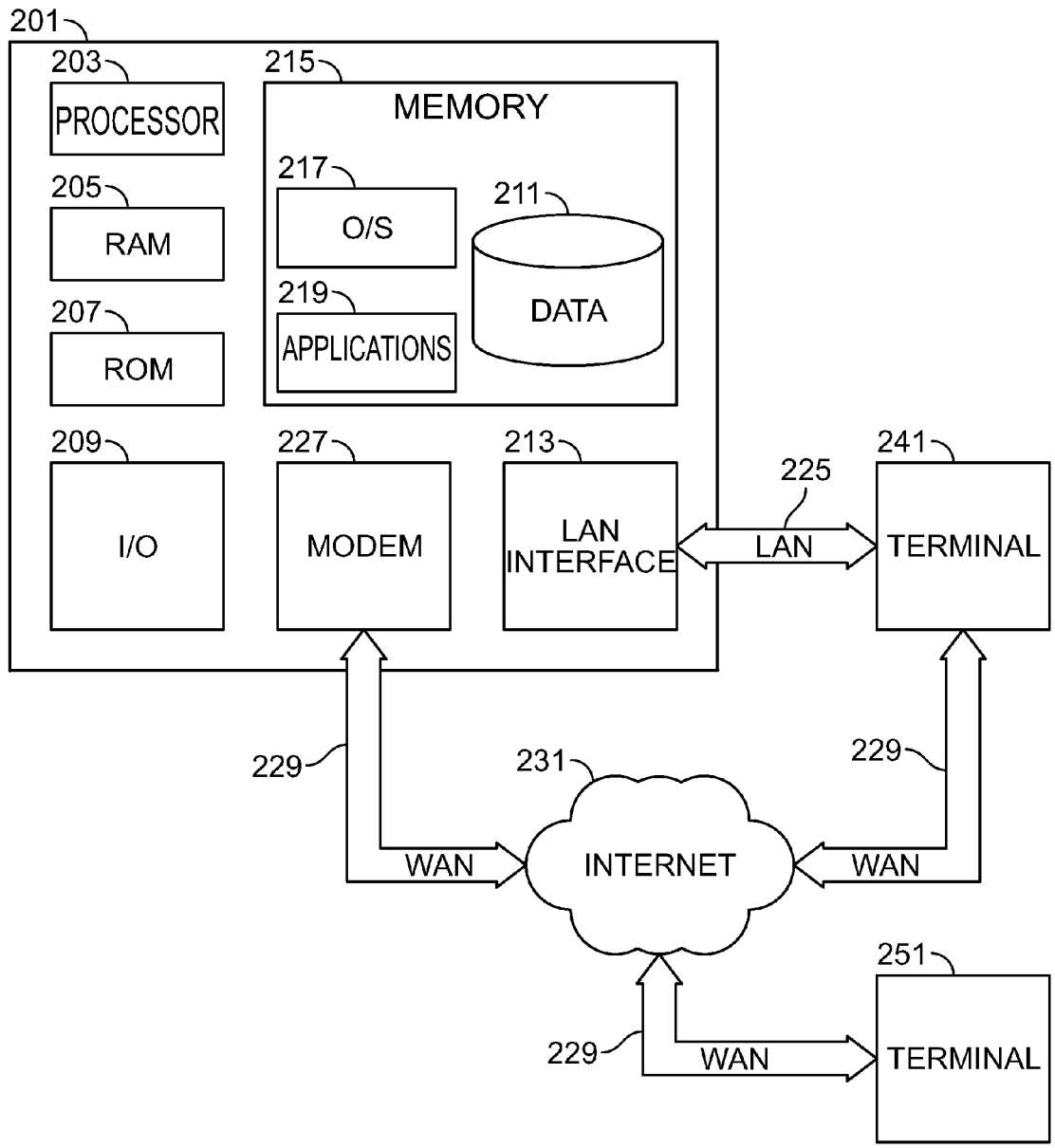
FIG. 2 shows a schematic diagram of a general purpose digital computing environment in which one or more aspects of the present invention may be implemented.

FIG. 2 illustrates a block diagram of a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 215.

I/O module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 221. Alternatively, some or all of server 201 computer executable instructions may be embodied in hardware or firmware (not shown). As described in detail below, database 221 may provide centralized storage of dynamic display patterns, shapes or methods.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219 used by server 201 according to an illustrative embodiment of the invention may include computer executable instructions for invoking user functionality related to communication, such as email, short message service ("SMS"), and voice input and speech recognition applications.

Computing device 201 and/or terminals 241 or 251 may also be mobile terminals including various other components, such as a battery, speaker, and antennas (not shown).

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 3:
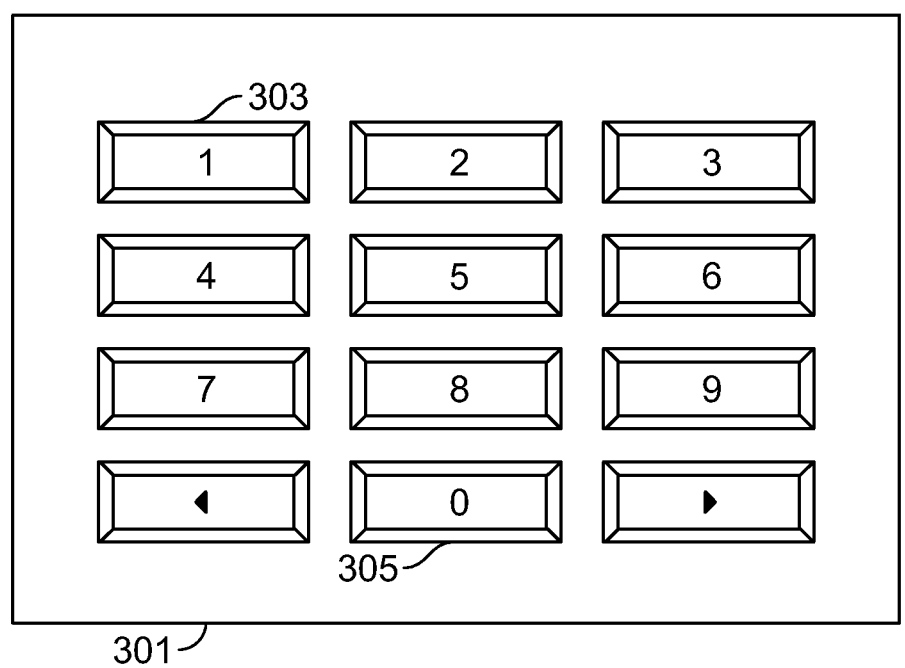
FIG. 3 shows a diagram of a conventional numeric layout.

FIG. 3 shows a diagram of a conventional numeric layout 301. The conventional numerical layout contains three rows of three numbers. The number one 303 appears in the top left corner, and the rest of the numbers up to nine follow sequentially. The number zero 305 appears below the three rows of numbers.

Figure 4:
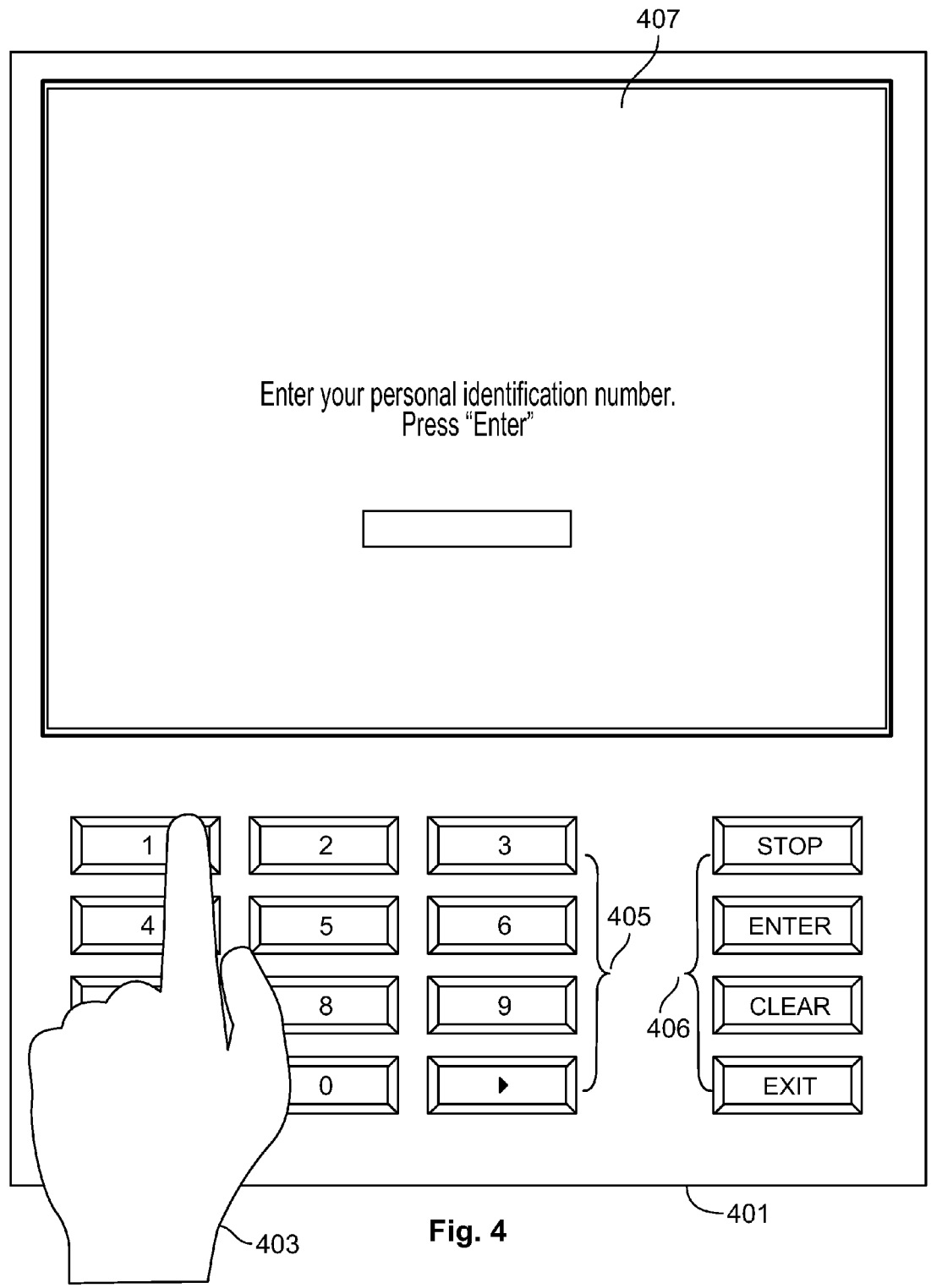
FIG. 4 shows a banking customer inputting information into an ATM using a keypad.

FIG. 4 shows an illustrative method of a banking customer 403 utilizing a keypad to select inputs for information entry into an ATM 401. In FIG. 4, the banking customer 403 selects inputs by applying pressure to or achieving contact with a button marked with the desired input. Inputs displayed on a keypad may include numeric inputs 405 and functional inputs 406. Instructions to the banking customer and inputs selected by the banking customer may be displayed on a screen 407.

Figure 5:
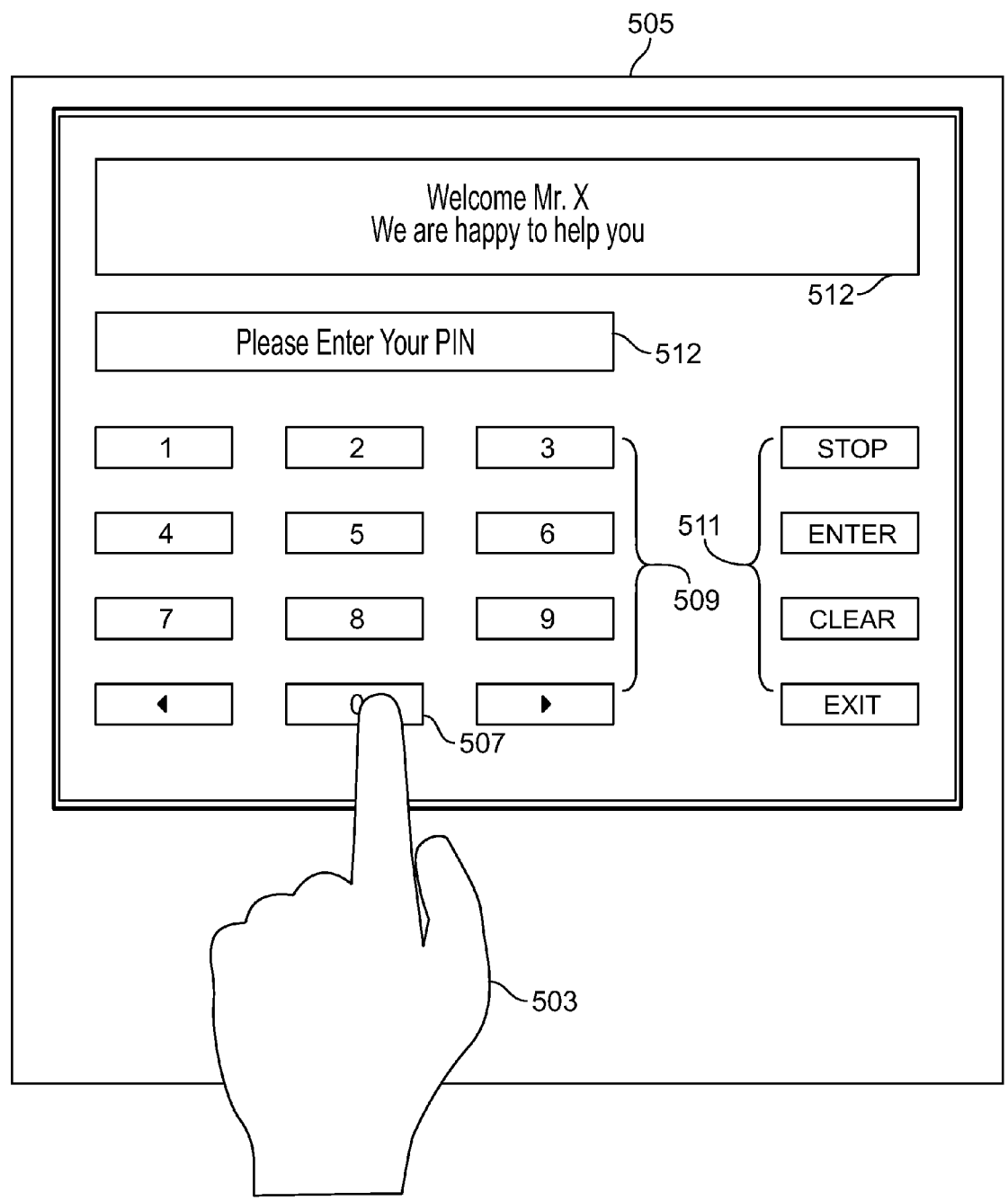
FIG. 5 shows a banking customer inputting information into an ATM using a touch screen.

FIG. 5 shows an illustrative method of a banking customer 503 utilizing a touch screen 505 to select inputs for information entry into an ATM. Inputs displayed may include numeric inputs 509 and/or functional inputs 511. The touch screen 505 may display additional information 512. In FIG. 5, the banking customer 503 selects inputs by touching displayed choices. The touch screen 505 detects the presence and location of a customer's "touch" within the display area. In FIG. 5 the banking customer 503 is shown selecting an input 507 representing the number zero.

FIG. 6 shows an illustrative dynamic display 601 of a randomized presentation of numeric inputs available for a user to select. In FIG. 6 the input representing a number two 603 is displayed in a position that conventionally represents a number one. The input representing a number six 605 is displayed in a position that conventionally represents a number nine.

Figure 7:
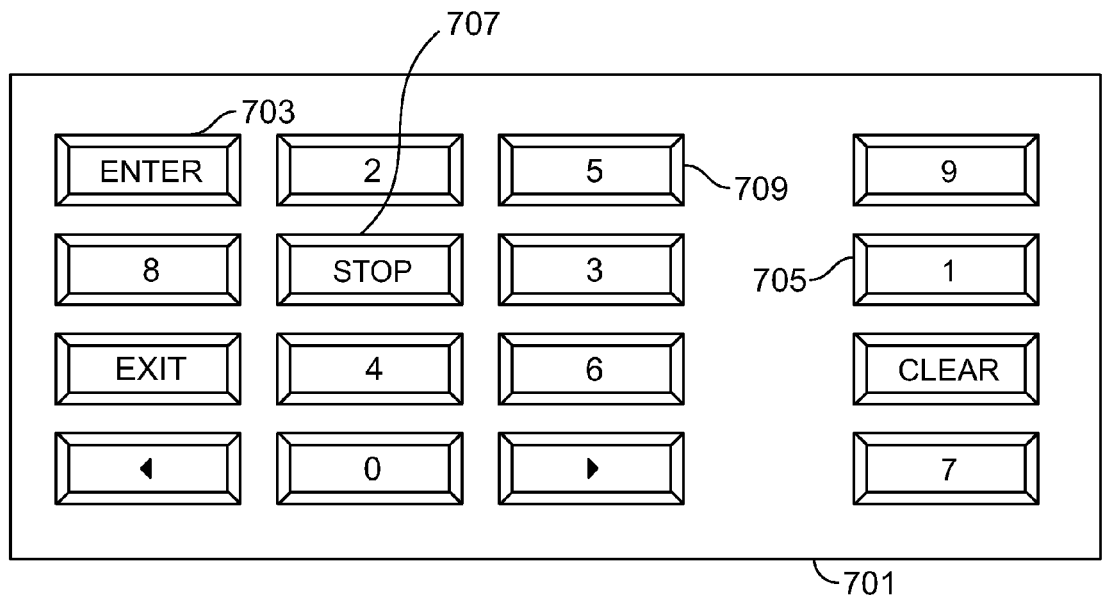
FIG. 7 shows a dynamic display of numeric and functional inputs.

FIG. 7 shows another illustrative dynamic display 701 of a randomized presentation of inputs available for a user to select. In FIG. 7 the positions of functional and numeric inputs are randomized. An enter function 703 is displayed in a position that conventionally displays a number one 705. A stop function 707 is displayed in a position that conventionally displays a number five 709.

Figure 8:
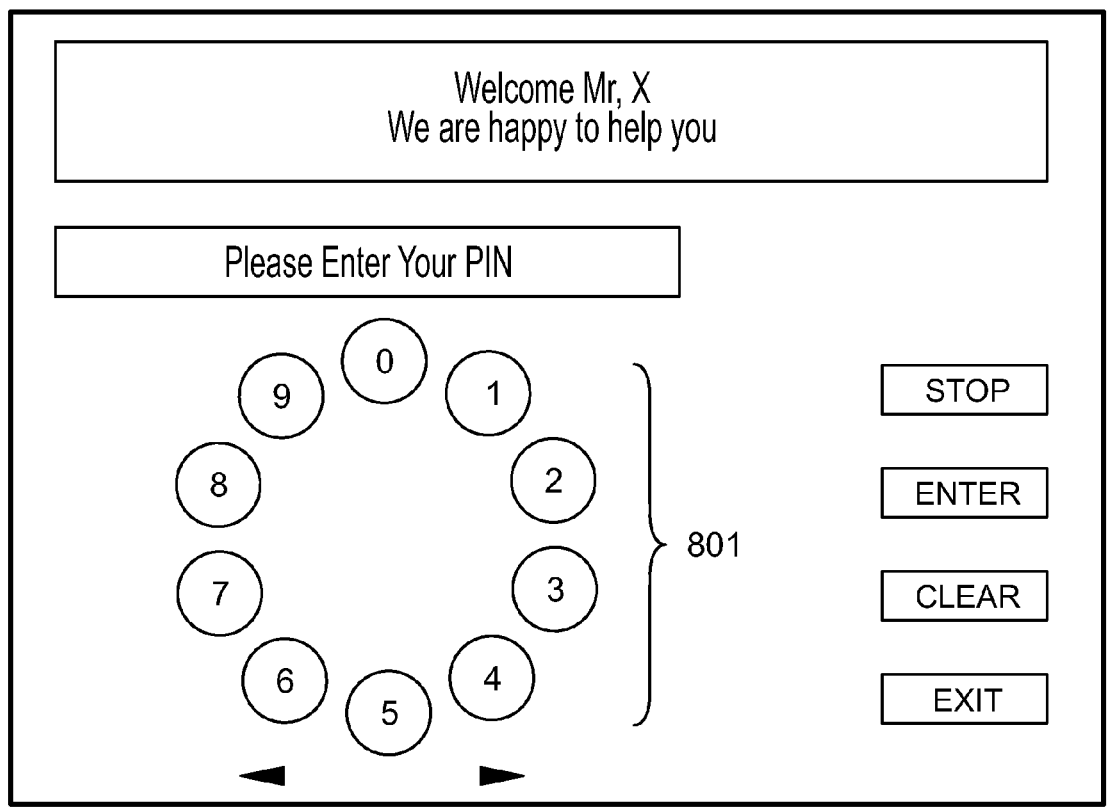
FIG. 8 shows a dynamic display of keys presented in a non-conventional pattern.

FIG. 8 shows another dynamic display of an illustrative non-conventional pattern presentation of inputs available for a user to select. FIG. 8 shows the numeric inputs displayed in an oval shape 801. Although the sequential order of the numbers displayed has not been changed, the pattern of the presentation alters the appearance of the presented inputs from a conventional layout. Each customer may be presented with a pattern randomly chosen from a set of defined patterns (not shown). Varying the different patterns presented preferably makes mapping hand movements to inputs selected more difficult.

Figure 9:
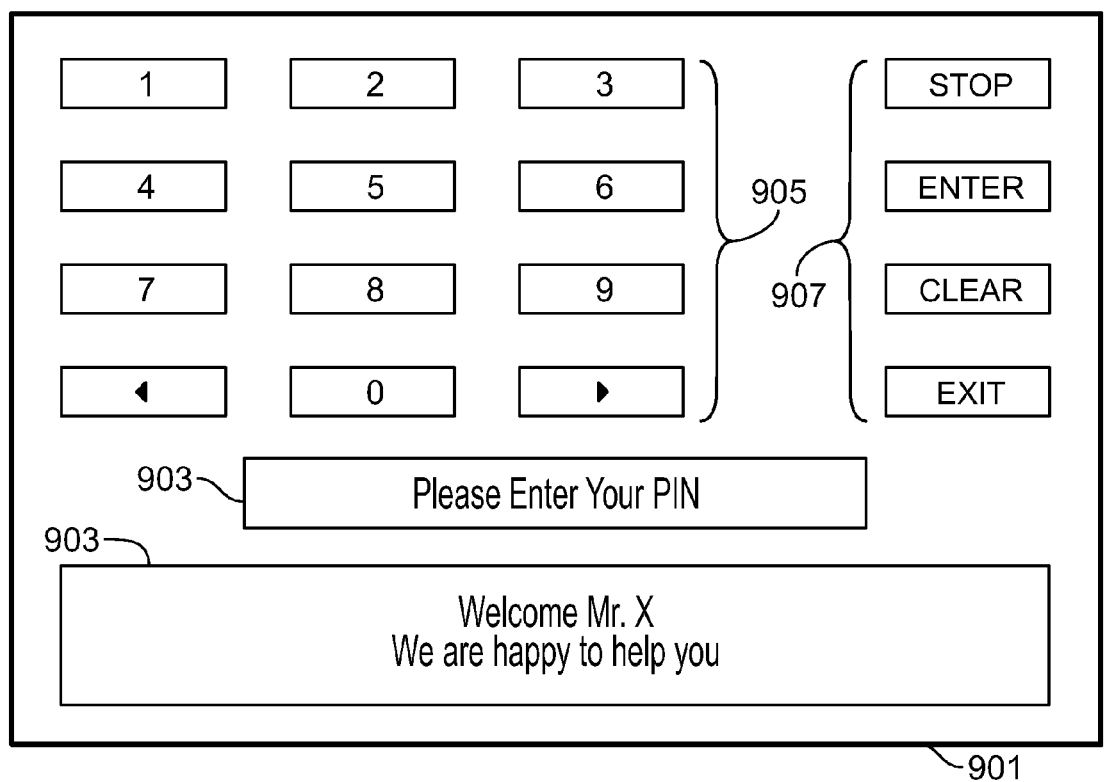
FIG. 9 shows a dynamic display based on shifting off-center with respect to the overall display the position of the displayed inputs.

FIG. 9 shows a dynamic display 901 based on shifting off-center with respect to the overall display the position of the displayed inputs. In FIG. 9 the numeric inputs 905 and functional inputs 907 have been shifted toward the top of screen 901. Additional information 903 has been shifted toward the bottom of screen 901. Varying the positions of displayed inputs relative to the center of screen 901 makes it more difficult for a hidden camera to record the hand movements of a customer.

Figure 10:
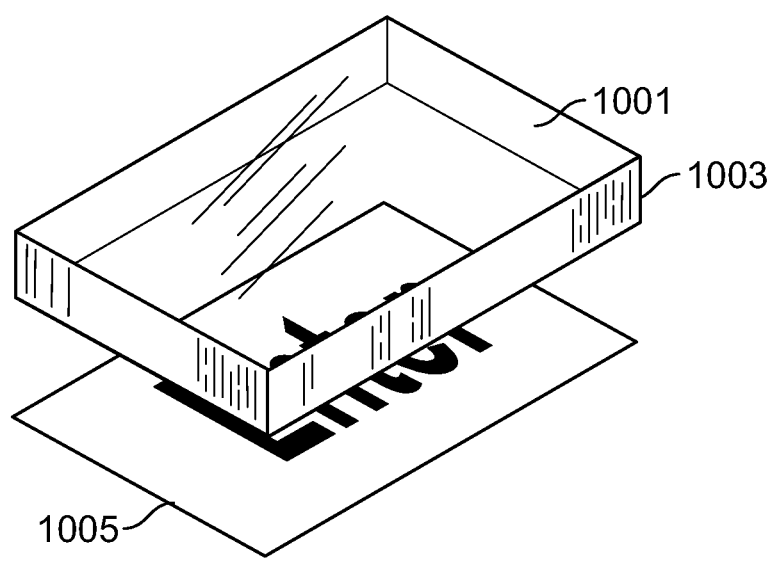
FIG. 10 shows a dynamic key.

FIG. 10 shows a dynamic key. The key utilizes a transparent surface 1001 and a screen 1005 visible through the transparent surface 1001. The screen 1005 may dynamically present different input choices to different banking customer. In some embodiments offsetting the screen 1005 from the transparent surface 1001 causes the side wall 1003 to form a tunnel that restricts the viewing angle of inputs displayed by screen 1005.

Thus, systems and methods for providing a more secure ATM transaction system have been provided. Persons skilled in the art will appreciate that the present invention can be practiced by other than the described embodiments, which are presented for purposes of illustration rather than of limitation. The present invention is limited only by the claims that follow.

What is claimed is:

1. A system for providing a more secure entry of four numeric inputs part of a confidential access sequence comprising:
an input/output device configured to display ten numeric inputs available for a user selection and to accept a user selection of the four numeric inputs;
a machine readable memory configured to store machine executable instructions for displaying only the four numeric inputs part of a user's confidential access sequence in pre-determined, temporary positions and displaying at least five of the ten numeric inputs in conventional positions; and a processor device configured to execute the machine executable instructions for displaying only the four numeric inputs part of the user's confidential access sequence in pre-determined, temporary positions, displaying the at least five numeric inputs in conventional positions and communicate the pre-determined, temporary positions and the conventional positions to the input/output device;

wherein the conventional positions comprise displaying the at least five numeric inputs in ascending order and dispersed among at least two rows, each row comprising positions for not more than three of the ten numeric inputs.

2. The system of claim 1 wherein the input/output device is a touch screen.

3. The system of claim 2 further comprising a touch screen with a narrow viewing angle.

4. The system of claim 2 wherein the machine executable instructions further comprise instructions for displaying in pre-determined, temporary positions the four numeric inputs based on adjusting the displayed pattern formed by the four numeric inputs.

5. The system of claim 2 wherein the machine executable instructions further comprise instructions for displaying in pre-determined, temporary positions the four numeric inputs based on shifting off-center with respect to the overall display the position of the four numeric inputs.

6. The system of claim 1 wherein the input/output device is a mobile device comprising a touch screen.

7. The system of claim 1 wherein the machine executable instructions further comprise instructions for displaying in pre-determined, temporary positions the four numeric inputs based on randomizing the displayed positions of the four numeric inputs.

8. The system of claim 1 further comprising when the pre-determined, temporary positions are first pre-determined, temporary positions, machine executable instructions for, after each input selected by the user, dynamically displaying only the remaining unselected numeric inputs part of the user's confidential access sequence of four numeric inputs in pre-determined, temporary second positions.

9. A method for providing a more secure entry of a confidential access sequence, the confidential access sequence comprising four numeric inputs selected from among ten numeric inputs, the method comprising:

for a first user, displaying only the four numeric inputs part of the first user's confidential access sequence in first positions;

for a second user, displaying only the four numeric inputs part of the second user's confidential access sequence in second positions;

displaying at least five of the ten numeric inputs not part of the first or the second user's confidential access sequence in conventional positions; and displaying the four numeric inputs part of the first or the second user's confidential access sequence in conventional positions after a defined number of invalid entries of the confidential access sequence of the first or the second user;

wherein said first positions and said second positions are different; and wherein the conventional positions comprise displaying the at least five numeric inputs in ascending order and dispersed among at least two rows, each row comprising positions for not more than three of the ten numeric inputs.

10. A method for providing a more secure entry of a confidential access sequence comprising:

for a first user, displaying four out of ten numeric inputs available for selection in a first layout;

for a second user, displaying four out of ten numeric inputs available for selection in a second layout;

for the first and second users, displaying at least five of the ten numeric inputs in a conventional layout; and displaying all the ten numeric inputs available for the first and the second user selection in the conventional layout after a defined number of invalid entries of a confidential access sequence;

wherein said first layout and said second layout are different; and wherein the conventional layout comprises displaying at least five of the ten numeric inputs in ascending order and dispersed among at least two rows, each row comprising positions for not more than three of the ten numeric inputs.

11. The method of claim 10 wherein the first or second layout comprises displaying the four numeric inputs in pre-determined, temporary positions.

12. The method of claim 11 comprising determining the predetermined, temporary positions based on randomizing the displayed positions of the four numeric inputs.

13. The method of claim 10, the first or second layout comprising displaying in predetermined, temporary positions the four numeric inputs based on randomizing the displayed positions of the four numeric inputs after each user selection until a valid confidential access sequence has been entered.

14. The method of claim 10 further comprising presenting an option of displaying a conventional layout of the four numeric inputs;

wherein the conventional layout comprises displaying at least one of:
a display of numerical inputs one through nine sequentially in three rows of three keys starting with the number one in the top left corner;
a display of numerical inputs one through nine sequentially in three rows of three keys starting with the number one in the bottom left corner; and
a display of alphabetic inputs in a QWERTY layout.

15. The method of claim 10 wherein the defined number of invalid entries is system defined.

16. The method of claim 10 wherein the defined number of invalid entries is user defined.

17. The method of claim 10 wherein the defined number of invalid entries is based on a randomized selection of a number selected from a set of numbers less than a system defined maximum.

18. The method of claim 10 further comprising for the first or second user displaying the four numeric inputs in the conventional layout following the entry of a valid confidential access sequence.

19. The method of claim 10 wherein the first or the second layout comprises displaying in pre-determined, temporary positions the four numeric inputs available for selection based on shifting off-center with respect to the overall display the position of the four numeric inputs available for selection.

20. The method of claim 10 wherein the first or the second layout comprises displaying in pre-determined, temporary positions the four numeric inputs available for selection based on adjusting the displayed pattern formed by the four numeric inputs available for selection.

21. The method of claim 20 wherein the displayed pattern formed by the four numeric inputs available for selection is randomly chosen from a set of defined shapes.

22. The method of claim 10 wherein the first or the second layout comprises displaying functional inputs available for selection in pre-determined, temporary positions.

23. The method of claim 22 further comprising determining the pre-determined, temporary positions based on randomizing the positions of the displayed four numeric inputs.

24. The method of claim 10 further comprising displaying the four numeric inputs available for selection at a narrow viewing angle.

\* \* \* \* \*